United States Patent
Cox

[11] 3,893,633
[45] July 8, 1975

[54] TREE THINNING AND REDUCING MACHINE

[76] Inventor: Ernest P. Cox, P.O. Box 154, Lolo, Mont. 59847

[22] Filed: Aug. 15, 1974

[21] Appl. No.: 497,668

[52] U.S. Cl. .............. 241/101.7; 241/190; 241/236
[51] Int. Cl.² .................... B02C 13/09; B02C 21/02
[58] Field of Search ........ 241/101.7, 235, 236, 190; 144/2 R, 162 A, 212, 312

[56] References Cited
UNITED STATES PATENTS

| | | | |
|---|---|---|---|
| 3,545,692 | 12/1970 | Burkett | 241/101.7 X |
| 3,822,042 | 7/1974 | Roy | 241/101.7 X |
| 3,850,375 | 11/1974 | Ford | 241/101.7 |

*Primary Examiner*—Granville Y. Custer, Jr.
*Assistant Examiner*—E. F. Desmond
*Attorney, Agent, or Firm*—Lawrence L. Colbert

[57] ABSTRACT

A tractor-drawn multiple rotor machine employs on each rotor shaft plural wood breaking teeth units which coact with plural transverse breaker bars carried by the massive frame of the machine. Second growth timber is overrun by the machine and forced downwardly into near parallelism with the rotor shafts of the machine, where the breaking teeth engage the timber and force it upwardly against the breaker bars and reduce it into relatively short lengths. The machine includes its own power plant and gearing to drive the rotor shafts.

10 Claims, 5 Drawing Figures

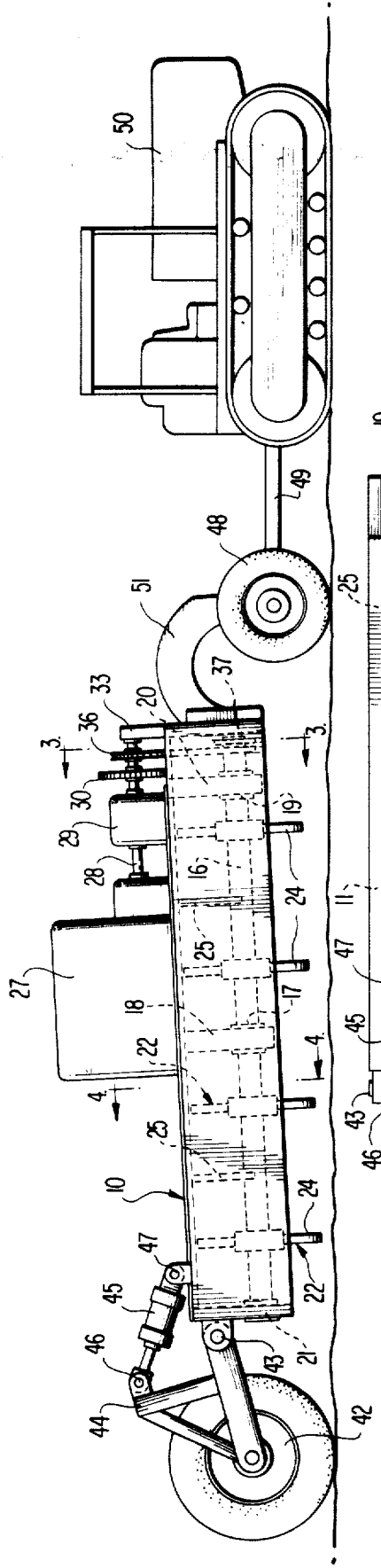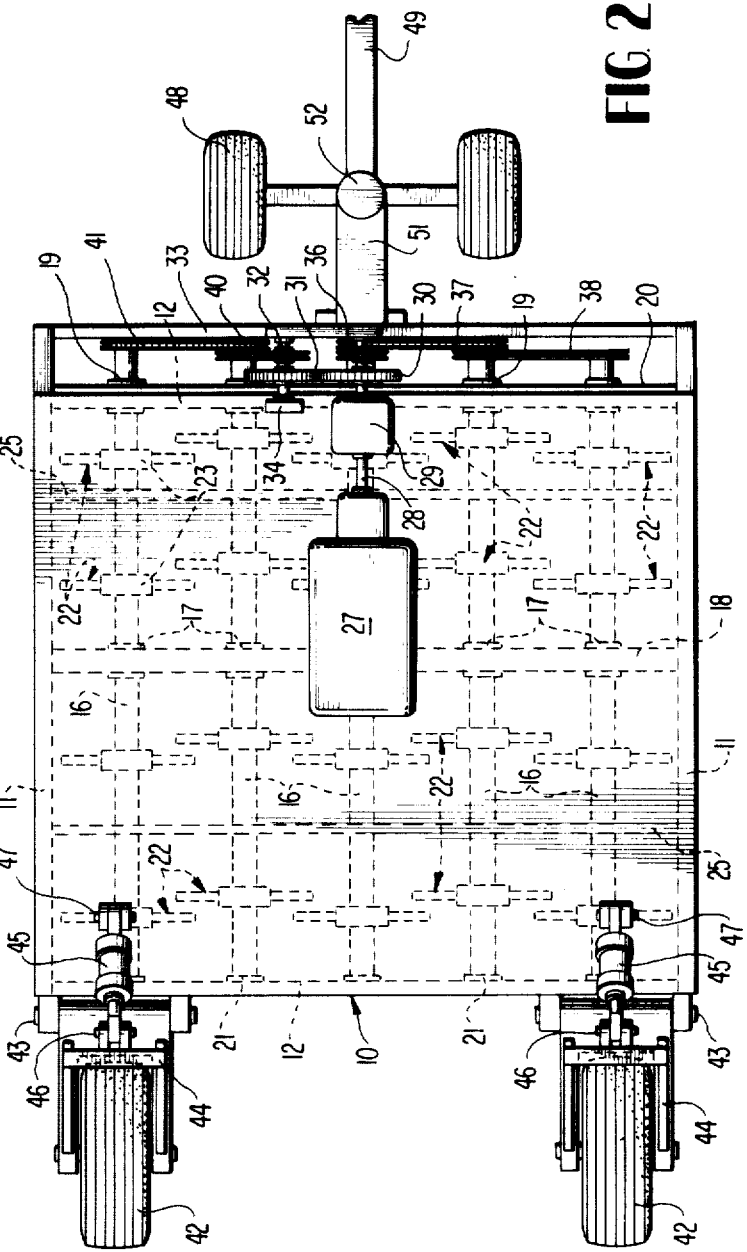

TREE THINNING AND REDUCING MACHINE

BACKGROUND OF THE INVENTION

This invention has grown out of a need for forests to be properly thinned so that the growing demand for wood can be met economically. It is a recognized fact that at least twice as much usable timber could be produced in this country if the present stands of timber and future forests could be thinned.

Present methods of thinning are slow, inefficient and prohibitively high in cost. One such method involves sawing the standing timber at very high cost per acre and this method leaves debris at least several feet deep on the ground. This debris creates an enormous fire hazard and also prevents many animals as well as man from having an unobstructed passage through the forest.

Another method of forest thinning is to simply bulldoze the secondary growth to the ground with heavy equipment. This also leaves large unsightly piles of debris which are a fire hazard. Additionally, there is no practical way to utilize this down timber for any purpose and it is lost. The piles of debris created by bulldozing are so large that the wood cannot readily return to the soil by natural processess. This bulldozing method is not favored by timber management authorities.

The only favored method, and one which can be employed in limited areas only, is to thin the forest by removing the larger trees for commercial usage, thus leaving the smaller ones with added room to grow. This method can only be used in areas where the timber is in mixed sizes, with the larger sizes sufficient for practical logging.

The country possesses enormous acreage, from burns, clearcutting and natural reseeding, where the timber is too small for commercial use and so thickly planted that it is literally chocking itself out of existence. These kinds of timber stands remain virtually last-mentioned and most abundant type of timber which is now being almost totally neglected and wasted. The invention may also be used to thin trees in any situation where there is sufficient clearance for the machine to travel freely. In this connection, it is to be noted that forest management authorities recommend 15 feet as an ideal spacing for trees. The present machine will produce a strip 13½ feet wide by taking down seconary growth and reducing such trees to lengths of wood measuring about 3 feet. The machine will leave the reduced wood in an orderly path behind it spread out flat on the ground where it can be readily picked up for use as fuel or for chips for making particle board or the like. The debris, if left on the ground, will quickly rot and return to the soil, without in the meantime forming an obstruction to the movement of man or animals or creating a fire hazard.

The machine will thin out young timber up to 8 or 10 inches in diameter. For timber above 6 inches in diameter, the machine will split the trees at least once and leave the debris spread out on the ground. With the rotor shafts revolving at 100RPM, multiplied by the number of shafts and by the number of teeth on each shaft, it has been determined that the machine brings 8000 teeth per minute into engagement with the downed wood to be reduced. With the machine moving at 2 miles per hour, it will thin 3¾ acres per hour at a cost of only $20 per acre and with a reasonable profit to the thinning contractor. The machine requires only one man to operate, is extremely rugged and durable and thus requires little maintenance. The machine embodying the invention weighs approximately 12 tons and will be towed either by a track laying tractor or a rubber-tired tractor, in some cases.

Other features and advantages of the invention will become apparent during the course of the following description.

BRIEF DESCRIPTION OF DRAWING FIGURES

FIG. 1 is a side elevational view of a tree thinning machine embodying the invention.

FIG. 2 is a plan view of the machine.

DETAILED DESCRIPTION

Figure 3:
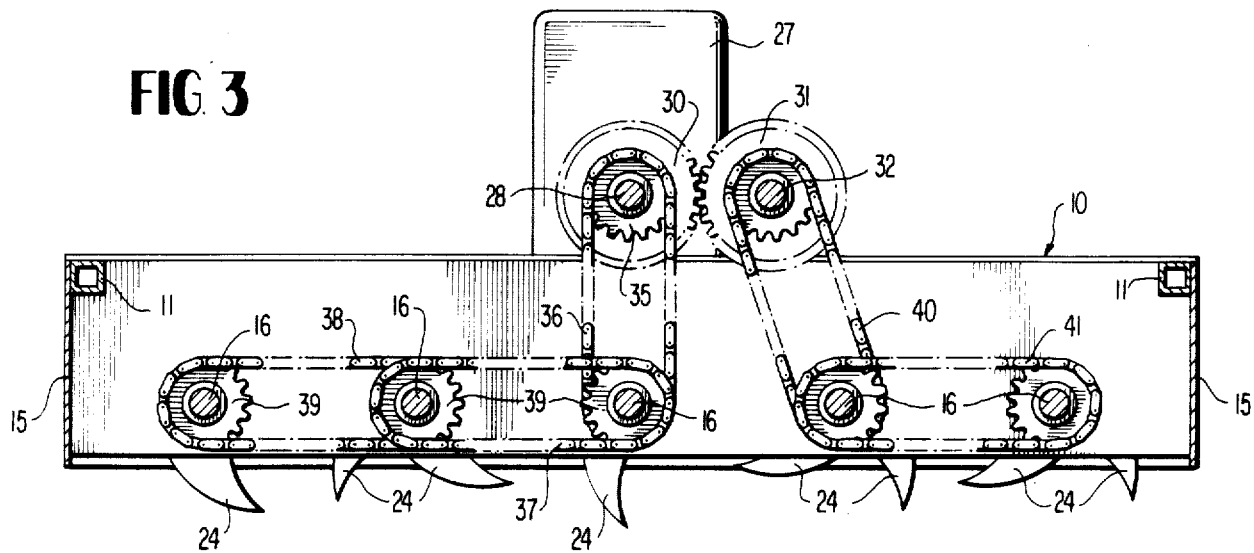
FIG. 3 is a transverse vertical section taken on line 3—3 of FIG. 1.

Referring to the drawings in detail wherein like numerals designate like parts, the machine embodies a massive rectangular frame or body portion 10 formed by longitudinal and transverse rigidly connected frame bars 11 and 12 and additional spaced longitudinal reinforcing frame members 13, such as I-beam sections. The frame or body portion 10 also possesses a flat top deck 14 and vertical side walls 15, as shown, and is preferably of welded construction.

The machine additionally comprises preferably five parallel spaced rotor shafts 16 mounted for rotation on the body portion 10 as will be fully described. These rotor shafts are of heavy construction and are supported near their longitudinal centers by bearings 17 joined thereto by welding. Similarly, the forward end portions of shafts 16 are journaled in additional bearings 19 carried by a forward main crossbar 20 of the body portion 10. The rearward ends of the several shafts 16 are supported by bearings 21 suitably held by the rear end of frame or body portion 10.

Each rotor shaft 16 is equipped along its length with preferably four toothed rotor heads or units 22 each having a hub portion 23 and four equidistantly spaced generally radial wood reduction teeth 24 which are tapered and longitudinally curved as shown in the drawings. The hubs 23 of these toothed units 22 are suitably secured on the shafts 16 rigidly to turn therewith. The units 22 are spaced apart equidistantly on their shafts and are staggered longitudinally relative to the toothed units on adjacent shafts 16, as shown in FIG. 2, so that the teeth of the units 22 on adjacent shafts overlap radially during operation. The outside diameters of the toothed rotor units 22 will approximate 32 inches and their spacing on the shaft 16 is approximately 3 feet, which spacing determines the length into which the reduced wood is broken by the machine as it travels through a forest.

Figure 4:
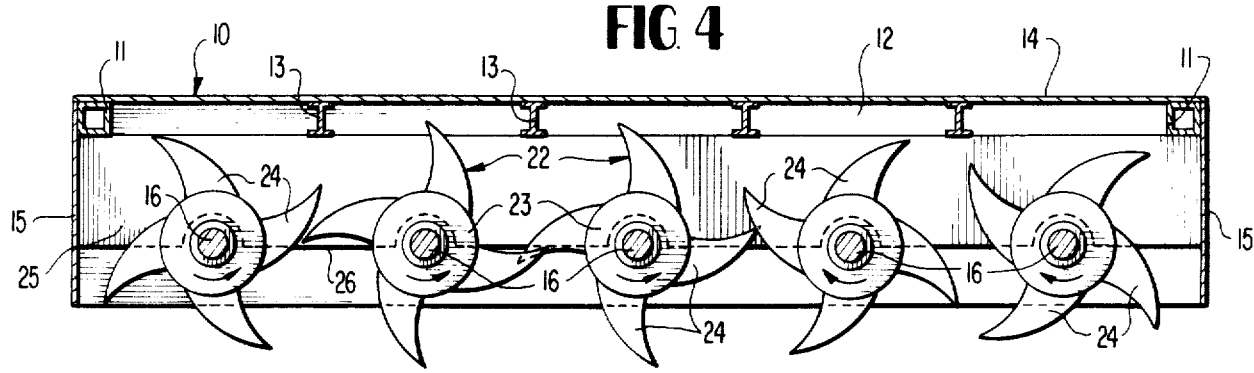
FIG. 4 is a similar view taken on line 4—4 of FIG. 1.
Figure 5:
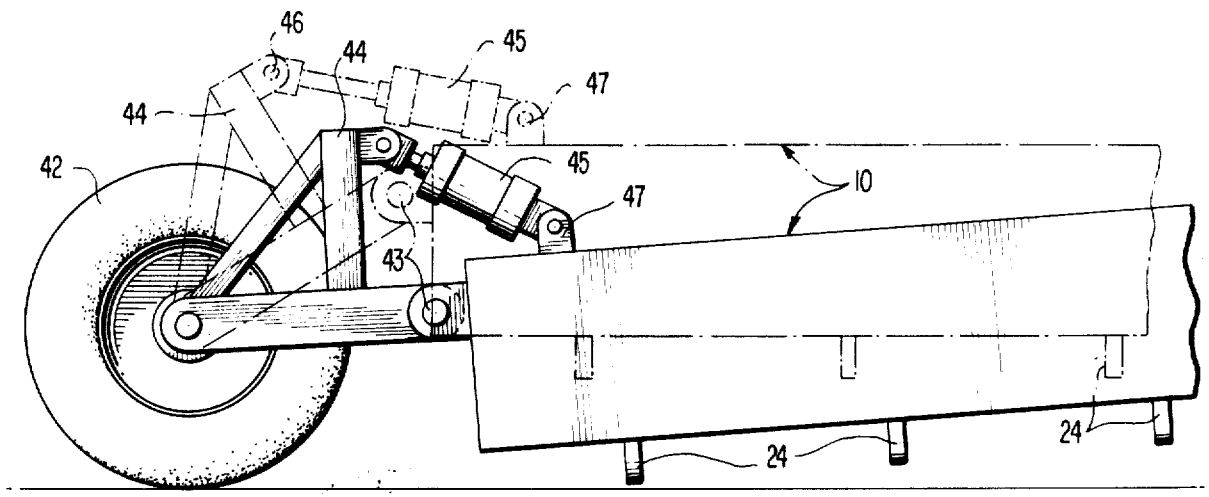
FIG. 5 is an enlarged fragmentary side elevation of the rear end portion of the machine illustrating means to adjust the height of the machine relative to the ground.

Coacting with the rotor teeth in breaking up downed secondary timber is a pair of parallel transverse breaking bars 25, rigidly joined to the top and side walls of body portion 10 and spanning the same transversely between pairs of the toothed rotor units 22 on the several shafts 16. The before-mentioned main crossbars 18 and 20 which support the bearings 17 and 19 form additional breaking bars for the downed wood or trees. As shown in FIG. 4, the lower edges 26 of the several breaking bars preferably terminate in a plane with the axes of the shafts 16. The spacing of the several breaking bars in relation to the rotor units 22 is such that the downed timber will be broken up into relatively uniform 3 foot lengths, approximately.

Means are provided to rotate the several shafts 16 in unison. This means comprises a suitable engine 27 mounted directly on the body portion 10 centrally and having an output shaft 28 driving a speed reducer 29. A gear 30 on the output shaft 28 meshes with a similar gear 31 on a short parallel countershaft 32, the latter being held in suitable bearings on the top of body portion 10 and on a frontal extension 33 of the machine body portion, the rearward bearing for the shaft 32 being indicated at 34 in FIG. 2.

On the shaft 28 ahead of the gear 30, FIG. 3, is a sprocket gear 35 drivingly connected with a sprocket chain 36, in turn engaged with another sprocket gear on the immediately below shaft 16. Referring to FIGS. 2 and 3, the central shaft 16 and two of the shafts on one side thereof are driven in the same direction and unison by sprocket chains 37 and 38 engaged with sprocket gears 39 on the three shafts. As viewed in FIGS. 3 and 4, the three shafts 16 driven directly from the shaft 28 through the intervening sprocket gearing turn clockwise, and the pointed tips of the curved tapered teeth 24 on these three shafts are directed to engage and lift the downed timber upwardly into engagement with the breaker bars 25 when the machine is in operation.

Similarly, the countershaft 22 drives sprocket gearing 40 and 41, FIGS. 2 and 3, to transmit simultaneous rotation in the opposite direction to the two shafts 16 on the other side of the center shaft shown in FIG. 3. As viewed in this figure, these latter two shafts will be turning clockwise while the three shafts to the left are turning counterclockwise. The rotor teeth on the two shafts to the right are directed oppositely to the teeth on the three shafts to the left to also lift wood and force the same against transverse breaker bars 25, while such wood or timber is forced downwardly by the machine to a near horizontal position in substantial parallelism to the direction of movement of the machine and to the axes of the shafts 16.

The machine is supported at its rear end by a pair of trailing wheel assemblies 42, pivotally attached at 43 to the rear of body portion 10. Each wheel unit 42 has an upright frame 44 thereon swingable about the axis of pivot 43 by a hydraulic ram 45 which is pivotally coupled to the frame 44 as at 46 and also pivotally coupled at 47 to the top of the body portion 10. Operation of the rams 45 by conventional control means, not shown, accomplishes the raising and lowering of the rear end of the machine as desired to meet particular conditions of the terrain.

The front of the body portion 10 is supported by a steerable wheel assembly 48 coupled by a tongue 49 to the towing tractor 50. A gooseneck support 51 rigid with frame member 33 is connected with the axle structure of the front wheel assembly by a ball and socket unit 52 which allows the front wheels to rise and fall with ground irregularities, as well as facilitating steering by the tongue 49.

It should be understood that the dimensions of the machine specified previously, its weight, the number of rotor shafts 16 and the number and spacing of the breaker plates 25 and 18 are subject to some variation within the scope of the invention and the invention, therefore, is not limited to the precise arrangement in the drawings. However, the drawings and description cover a preferred structural arrangement and one which is thought to be practical and efficient.

In the operation of the machine for thinning second growth timber, the machine will travel at a constant speed of about 2 miles per hour with the several rotor shafts revolving at about 100 RPM in the directions shown by the arrows in FIG. 4. The rear wheel mechanism is adjusted so that the rotor teeth 24 are quite close to the ground.

As the trees to be thinned out are encountered by the machine, the front of the body portion 10 will push or knock them down in the direction of travel of the machine whereby their main trunks will be generally parallel to the shafts 16 and will be generally horizontally disposed beneath the body portion 10 as the latter passes over them. The downed trees, therefore, will be lying at approximately 90° to the direction of movement of the teeth 24, and such rotor teeth will engage and tend to pick up the timber, forcing it upwardly against the breaker bars 25 and 18 which will act in conjunction with the toothed rotor units 22 to break up the timber into approximately 3 foot lengths. The heavy teeth 24 will have tremendous power due to the size of the engine 27 employed and the speed reduction gearing. The arrangement and spacing of the rotor units 22 will assure that all downed timber falling under the machine will be reduced to relatively uniform short pieces which will be spread evenly on the ground after passage of the machine which is about 20 feet long between the front and rear wheel axles.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A tree thinning and wood reduction machine comprising a wheeled body portion adapted to travel through standing timber at an elevation close to ground level, plural spaced parallel longitudinal rotor shafts on said body portion and extending in the front-to-back direction thereon, plural toothed rotor heads on each rotor shaft turning therewith with the teeth of the rotor heads traveling close to the ground during turning and with the teeth turning in planes which are at right angles to the axes of the rotor shafts, said rotor heads on each shaft spaced apart axially thereon, and power means on the body portion coupled with the rotor shafts for turning the shafts in unison and in rotational directions causing said teeth to engage timber downed by the machine and to force the timber upwardly, and plural transversely extending front-to-back spaced breaker bars on said body portion substantially at right angles to said rotor shafts and crossing the latter and disposed between pairs of said rotor heads on said shafts and coacting with said teeth to reduce downed timber into roughly uniform relatively short lengths.

2. The structure of claim 1, wherein the rotor heads on each rotor shaft are staggered somewhat axially relative to the rotor heads of adjacent shafts so that the teeth of the rotor heads of adjacent shafts overlap.

3. The structure of claim 2, wherein said teeth of each rotor head are tapered and longitudinally curved and have leading tips which face forwardly in relation to the direction of rotation of the shaft on which they are mounted.

4. The structure of claim 3, wherein the teeth of each rotor head are four in number and are of equal length and equidistantly spaced apart circumferentially.

5. The structure of claim 1, wherein said wheeled body portion comprises a rectangular frame including a top wall and depending side walls, and said spaced breaker bars are fixedly secured to said top and side walls of the body portion with their lower transverse edges disposed approximately at the elevation of the axes of said rotor shafts, such axes lying substantially in a common plane intermediate the top and bottom of the body portion, the tips of said teeth during rotation projecting substantially below the bottom of the body portion.

6. The structure of claim 1, wherein the wheeled body portion includes a front steering wheel assembly having a tongue adapted to be drawn by a tractor and a supporting member coupled to the front of the body portion and carrying it at a fixed elevation, and rear adjustable supporting wheel means for the body portion operable to raise and lower the body portion relative to the ground.

7. The structure of claim 6, and said rear wheel means comprising a pair of rear wheels having frames pivotally attached near the rear corners of the body portion for vertical swinging movement, and power means interconnecting said frames and body portion whereby the rear end of the body portion may be raised and lowered and held at a selected elevation.

8. The structure of claim 1, and said power means comprising a prime mover on the top of the body portion substantially centrally, and transmission gearing drivingly connecting an output shaft of the prime mover with said rotor shafts.

9. The structure of claim 8, wherein said transmission gearing comprises divided gear trains drivingly connected with groups of said rotor shafts and turning the shafts of the groups oppositely with the rotor heads thereon.

10. The structure of claim 9, and said divided gear trains comprising sprocket gear trains with one gear train coupled to a pair of said rotor shafts and another gear train coupled to the remaining rotor shafts, a countershaft arranged parallel to the output shaft of the prime mover, sprocket gears on the output and countershafts drivingly connected with the sprocket gear trains to operate them in unison, and a pair of gears on the output and countershafts and being engaged to drive such shafts in unison.

* * * * *